United States Patent
Bohnheio (10) Patent No.: US 10,464,092 B2
(45) Date of Patent: Nov. 5, 2019

(54) PROCESSING APPARATUS FOR PROCESSING A WORKPIECE SURFACE WITH FLUID FLOW SHIELDING

(71) Applicant: Oerlikon Metco AG, Wohlen, Wohlen (CH)

(72) Inventor: Christian Bohnheio, Maegenwil (CH)

(73) Assignee: OERLIKON METCO AG, WOHLEN, Wohlen (CH)

( * ) Notice: Subject to any disclaimer, the term of this patent is extended or adjusted under 35 U.S.C. 154(b) by 99 days.

(21) Appl. No.: 14/267,155

(22) Filed: May 1, 2014

(65) Prior Publication Data
US 2014/0329009 A1 Nov. 6, 2014

(30) Foreign Application Priority Data

May 3, 2013 (EP) .................................. 13166353

(51) Int. Cl.
| | |
|---|---|
| *B05B 12/18* | (2018.01) |
| *B05B 13/06* | (2006.01) |
| *B05D 1/08* | (2006.01) |
| *B05C 11/10* | (2006.01) |
| *C23C 4/16* | (2016.01) |

(Continued)

(52) U.S. Cl.
CPC .......... *B05B 12/18* (2018.02); *B05B 13/0627* (2013.01); *B05B 13/0636* (2013.01); *B05C 11/1015* (2013.01); *B05D 1/08* (2013.01); *C23C 4/01* (2016.01); *C23C 4/16* (2013.01);
(Continued)

(58) Field of Classification Search
CPC ............ B05B 13/0618; B05B 13/0636; B05B 15/0431; B05B 7/20; B05B 9/01; B05D 1/01; C23C 4/01; C23C 4/16; C23C 3/131; B22D 19/0009
See application file for complete search history.

(56) References Cited

U.S. PATENT DOCUMENTS 3,027,870 A * 4/1962 Schirmer ................ B05B 14/00
118/504
3,778,292 A 12/1973 Rood et al.
(Continued)

FOREIGN PATENT DOCUMENTS

| | | |
|---|---|---|
| CN | 1330727 | 1/2002 |
| CN | 101426609 | 5/2009 |

(Continued)

OTHER PUBLICATIONS

Chinese Office Action issued in CN 2014101795966 dated Jul. 20, 2017 (16 pages).
(Continued)

*Primary Examiner* — Karl Kurple
(74) *Attorney, Agent, or Firm* — Greenblum & Bernstein, P.L.C.

(57) ABSTRACT

Processing apparatus and method for processing a workpiece surface, in particular for the internal coating of cylinder bores. Processing apparatus has a shield unit which is provided to separate from one another-at least during operation-a part region of the workpiece surface provided for the processing and an adjacently arranged part region of the workpiece surface. The shield unit has at least one blocking nozzle which is provided to generate a fluid flow for separating the at least two part regions.

13 Claims, 5 Drawing Sheets

(51) Int. Cl.
*C23C 4/01* (2016.01)
*B23K 9/32* (2006.01)
*B05B 7/20* (2006.01)

(52) U.S. Cl.
CPC ................. *B05B 7/20* (2013.01); *B23K 9/325* (2013.01); *Y10T 29/49272* (2015.01)

(56) References Cited

U.S. PATENT DOCUMENTS

| | | | | | |
|---|---|---|---|---|---|
| 4,168,055 | A | * | 9/1979 | Roeder | B23K 7/10 148/197 |
| 5,061,510 | A | * | 10/1991 | Nussbaumer | B05B 5/1683 118/309 |
| 5,271,967 | A | * | 12/1993 | Kramer | C23C 4/12 29/888.061 |
| 5,468,295 | A | * | 11/1995 | Marantz | B05B 7/0861 118/300 |
| 5,573,814 | A | * | 11/1996 | Donovan | C23C 4/16 427/448 |
| 5,662,266 | A | * | 9/1997 | Zurecki | B05B 7/0861 239/8 |
| 5,691,004 | A | * | 11/1997 | Palazzolo | C23C 4/02 427/236 |
| 6,183,563 | B1 | * | 2/2001 | Choi | C23C 16/4412 118/715 |
| 6,215,090 | B1 | * | 4/2001 | Severance, Jr. | H05H 1/34 219/121.48 |
| 6,395,090 | B1 | * | 5/2002 | Shepley | B05B 12/20 118/504 |
| 6,703,579 | B1 | * | 3/2004 | Rice | B23K 10/006 219/121.47 |
| 6,753,497 | B1 | * | 6/2004 | Matus | B23K 9/067 219/121.45 |
| 6,863,931 | B2 | * | 3/2005 | Someno | C23C 4/16 427/236 |
| 7,874,262 | B2 | * | 1/2011 | Bohnheio | B05B 12/20 118/504 |
| 9,074,276 | B2 | * | 7/2015 | Kanai | C23C 4/12 |
| 9,500,463 | B2 | * | 11/2016 | Killingbeck | G01B 5/25 |
| 2003/0152699 | A1 | * | 8/2003 | Someno | C23C 4/16 427/236 |
| 2003/0154919 | A1 | * | 8/2003 | Rice | B05B 12/20 118/504 |
| 2004/0083954 | A1 | * | 5/2004 | Nakamura | B05C 3/09 118/400 |
| 2004/0238511 | A1 | * | 12/2004 | Matus | B23K 9/0675 219/130.4 |
| 2006/0172066 | A1 | * | 8/2006 | Takahashi | C23C 4/16 427/236 |
| 2007/0256634 | A1 | * | 11/2007 | Simpson | B05D 1/18 118/406 |
| 2008/0000881 | A1 | * | 1/2008 | Storm | C23C 8/24 219/121.47 |
| 2010/0065662 | A1 | * | 3/2010 | Kodama | B05B 7/224 239/437 |
| 2010/0151399 | A1 | * | 6/2010 | Plebuch | B23K 7/06 432/23 |
| 2010/0270361 | A1 | * | 10/2010 | Englert | B23K 1/203 228/183 |
| 2010/0276396 | A1 | * | 11/2010 | Cooper | B08B 15/04 219/74 |
| 2011/0248000 | A1 | * | 10/2011 | Barhorst | B23K 9/1043 219/74 |
| 2014/0144892 | A1 | * | 5/2014 | Hussary | H05H 1/34 219/121.51 |
| 2014/0166770 | A1 | * | 6/2014 | Read | B05B 14/10 239/1 |
| 2014/0312011 | A1 | * | 10/2014 | Hosoya | B23K 10/02 219/121.46 |
| 2016/0230698 | A1 | * | 8/2016 | Hirano | B05B 7/16 |
| 2016/0296964 | A1 | * | 10/2016 | Osawa | B05B 5/081 |
| 2016/0362776 | A1 | * | 12/2016 | Shimizu | C23C 4/12 |
| 2017/0175668 | A1 | * | 6/2017 | Schepak | C23C 4/14 |
| 2018/0169672 | A1 | * | 6/2018 | Gliksman | B05B 1/28 |

FOREIGN PATENT DOCUMENTS

| | | | |
|---|---|---|---|
| CN | 101444149 | 5/2009 | |
| DE | 199 34 991 | 6/2000 | |
| DE | 19934991 A1 | * 6/2000 | ............... C23C 4/16 |
| DE | 10 2008 016 040 | 11/2009 | |
| JP | 10263448 A | * 10/1998 | |
| JP | 2000-246449 | 9/2000 | |
| JP | 2008-237975 | 10/2008 | |

OTHER PUBLICATIONS

Japanese Office Action (with English translation) issued in JP 2014-086223 dated Mar. 6, 2018 (8 pages).

* cited by examiner

| Stage 100 - A coating torch applies an internal coating to a cylinder block. |
|---|

| Sage 200 - A blocking nozzle moves to a position over an upper surface of a cylinder block and direct a fluid flow between two adjacent cylinder bores in the row. |
|---|

| Stage 300 – The blocking nozzle and a drive of the coating torch are control unit controlled. |
|---|

PROCESSING APPARATUS FOR PROCESSING A WORKPIECE SURFACE WITH FLUID FLOW SHIELDING

CROSS-REFERENCE TO RELATED APPLICATIONS

The present application claims priority under 35 U.S.C. § 119(a) of European Patent Application No. 13166353.6 filed May 3, 2013, the disclosure of which is expressly incorporated by reference herein in its entirety.

BACKGROUND OF THE INVENTION

1. Field of the Invention

The invention relates to a processing apparatus for processing a workpiece surface and to a method.

2. Discussion of Background Information

A processing apparatus for the internal coating of cylinder bores is already known from DE 10 2008 016 040 B3 having a shield unit which is provided to separate a part region of a workpiece surface provided for processing and a part region of the adjacently arranged workpiece surface at least during operation.

SUMMARY OF THE EMBODIMENTS

Embodiments of the invention provide a simple, flexibly usable processing apparatus for processing a workpiece surface as well as a corresponding method. Embodiments are directed to a processing apparatus in accordance with the invention and to a method in accordance with the invention.

The invention starts from a processing apparatus for processing a workpiece surface, in particular for the internal coating of cylinder bores, having a shield unit which is provided to separate a part region of the workpiece surface provided for processing and a part region of the adjacently arranged workpiece surface at least during operation.

It is proposed that the shield unit has at least one blocking nozzle which is provided to generate a fluid flow for separating the at least two part regions. A reliable separation of the two part regions can thereby be achieved without a mask or similar having to be used which has wear or which has to be cleaned at least from time to time, In addition, a mechanical separation can be dispensed with, whereby the shield unit can be used for different workpieces without different shield apparatus having to be kept available. A simple, flexibly usable processing apparatus can thus be provided by a design in accordance with the invention, A "separation during operation" is in this respect in particular to he understood such that only one of the part regions of the workpiece surface is exposed to a processing, whereas the second part region, which would be exposed to a processing without the shield unit, remains unprocessed. A "fluid flow" is in this respect in particular to be understood as a gas flow, A fluid flow for separating the part regions is in particular to he understood as a gas flow which ensures that the adjacently arranged part region, which is not intended for processing, remains free of processing. The processing apparatus is in this respect in particular provided for a contactless processing of the workpiece surface, such as a plasma coating or similar, A separation is in this respect in particular not to be understood as a mechanical separation of the part regions.

It is further proposed that the fluid flow which can be generated by the blocking nozzle is provided at least in part to be directed along the workpiece surface. It can thereby be achieved that the fluid flow flows along the workpiece surface so that the fluid flow can act in an analog manner to a mechanical barrier which is placed onto the workpiece surface. The part regions can thereby be particularly effectively separated from one another, "Directed at least partly along the workpiece surface" is in this respect in particular to be understood such that in operation the fluid flow has a flow direction in at least one part region which is directed at least substantially parallel to a main direction of extent of the workpiece surface. A "flow direction in a part region" is in this respect in particular to be understood as a middle flow direction of a part of the fluid flow. The fluid flow preferably overall has a middle flow direction which is directed along the workpiece surface. "At least substantially parallel" is in this respect in particular to be understood such that the middle flow direction and the workpiece surface have an angle of 180 degrees ±90 degrees. A "middle flow direction" is in this respect in particular to be understood as a middle flow direction of the fluid flow directly downstream of the blocking nozzle in a non-disturbed state.

The at least one blocking nozzle is preferably configured as a compressed air nozzle. The shield unit can thereby be particularly easily supplied with a fluid. Generally, however, other fluids, in particular other gases, can also be used for operating the blocking nozzle.

The blocking nozzle is particularly advantageously provided to generate a flat jet. A particularly advantageous shielding can thereby be achieved. The blocking nozzle can, however, generally also be provided for generating a round jet or another jet shape. A "flat jet" or a "round jet" are in this respect in particular to be understood as a shape of the flow fluid which is provided to separate the part regions from one another independently of a mechanical separation.

The blocking nozzle can alternatively also be provided to generate a compressed air cushion. A good shielding can likewise thereby be achieved. A "compressed air cushion" is in this respect in particular to be understood, in contrast to a flat jet or a round jet, as a shape of the fluid flow which is provided to generate the compressed air cushion in a region upstream of the blocking nozzle, whereby the blocking nozzle can provide a mechanical separation in addition to the separation by the fluid jet.

It is further proposed that the processing apparatus has a torch for processing the workpiece surface. By using a shield apparatus having a blocking nozzle in conjunction with a torch, a particularly simple, inexpensive processing apparatus can be provided for refining workpiece surfaces. A "torch" should in this respect in particular be understood as a unit for refining a workpiece surface under the effect of a temperature such as a unit for plasma coating or similar.

The fluid flow which can be generated by the at least one blocking nozzle is preferably provided for deflecting a torch jet of the torch. The torch jet of the torch can thereby be simply deflected by the part region which is arrange adjacent to the part region provided for processing, whereby the part regions can be simply separated from one another by a torch with respect to a processing.

The blocking nozzle and the torch are particularly preferably arranged at an angle toward one another between 80 degrees and 150 degrees. The torch jet can thereby be deflected with high reliability. An "angle between the blocking nozzle and the torch" is in this respect in particular to be understood as an angle between a main expulsion direction of the blocking nozzle and a radiation direction of the torch. A "radiation direction" is in this respect in particular to be understood as a middle flow direction of the torch jet directly downstream of the torch.

Alternatively, the blocking nozzle and the torch can, however, also be arranged at an angle toward one another of approximately 180 degrees. Such a design is in particular advantageous when the blocking nozzle is provided to generate a compressed air cushion. "Approximately" should in this respect in particular be understood as a deviation of at most 10 degrees, advantageously of at most 5 degrees.

It is additionally proposed that the at least one blocking nozzle can be positioned relative to the torch. The blocking nozzle can thereby be positioned independently of the torch, whereby cylinder housings of different constructions can be processed.

It is further proposed that the processing apparatus has a second blocking nozzle which is provided to be arranged opposite the first blocking nozzle with respect to the torch, A two-sided shielding can thereby he achieved, whereby a part region, which is provided for processing, can be delineated from a plurality of part regions which are arranged in an adjacent manner. The blocking nozzles can preferably be positioned independently of one another.

In addition, it is advantageous if the processing apparatus has a support unit for the torch which has a support axis which is directed at least substantially perpendicular to a main expulsion direction of the at least one blocking nozzle. In particular inner walls of cylinder bores can thereby he processed without the inner walls of adjacent cylinder bores simultaneously being contaminated.

It is additionally proposed that the processing apparatus has a control unit for controlling the at least one blocking nozzle which is provided to activate or deactivate the blocking nozzle in dependence on an alignment and/or position of the torch. A demand-actuated activation of the blocking jet can thereby be achieved, whereby a consumption of fluid for operating the shield unit can be reduced. "In dependence on an alignment and/or a position of the torch" is in this respect in particular to be understood such that the control unit is provided to determine an angle-dependent alignment of the torch with respect to the rotational axis of the torch and/or an axial position of the torch along a direction of longitudinal extent of the cylinder bore and to switch on and/or switch off the blocking nozzle in dependence on the angle-dependent alignment and/or on the axial position of the torch.

In accordance with the invention, a method of processing a workpiece surface, in particular for an internal coating of cylinder cores, is moreover proposed, wherein a part region of the workpiece surface provided for the processing and an adjacently arranged part region of the workpiece surface are separated from one another at least during operation, wherein a fluid flow for separating the at least two part regions is generated by at least one blocking nozzle, whereby a workpiece surface can he processed particularly simply and the method can be used flexibly.

Further advantages result from the following description of the Figures. Two embodiments of the invention are shown in the Figures. The Figures, the description of the Figures and the claims contain a number of features in combination. The skilled person will also expediently consider the features individually and combine them to further sensible combinations.

In embodiments, the fluid flow is at least partly directed along a workpiece surface.

In embodiments, the at least one blocking nozzle is a compressed air nozzle.

In embodiments, the at least one blocking nozzle is configured to generate a flat jet.

In embodiments, the at least one blocking nozzle is configured to generate a compressed air cushion.

In embodiments, the fluid flow is configured to deflect a torch jet of the coating torch.

In embodiments, the blocking nozzle and the coating torch are arranged at angle toward one another between 80° and 150°.

In embodiments, the blocking nozzle and the coating torch are arranged at angle toward one another of 180°.

In embodiments, the at least one nozzle comprises first and second blocking nozzles, said second blocking nozzle being arranged opposite the first blocking nozzle with respect to the coating torch.

In embodiments, a support unit for the coating torch has a support axis that is directed at least perpendicular to a main expulsion direction of the at least one blocking nozzle.

In embodiments, the blocking nozzle comprises plural rows of openings that includes a first row of openings that directs a first fluid flow that impinges on the horizontal surface located between the one of the cylinder bores and the adjacent cylinder bore and a second fluid flow that deflects the torch jet of the coating nozzle.

The invention is also directed to a processing apparatus for coating a plurality of cylinder bores arranged in a row in a cylinder block having an upper surface, wherein the processing apparatus comprises a coating torch producing a torch jet and being structured and arranged to apply a coating to one of the cylinder bores, blocking nozzles arranged parallel to one another and being movable independently of the coating torch, each said blocking nozzle directing a fluid flow between the one of the cylinder bores and an adjacent cylinder bore. Each blocking nozzle being arranged to move to a position over the upper surface of the cylinder block and is disposed outside a respective cylinder bore when the coating torch is located inside the respective cylinder bore and having a shape and size that can overlie a first portion of the upper surface between two adjacent cylinder bores while leaving exposed portions of the upper surface located on opposite sides of each of the two adjacent cylinder bores, wherein the fluid flow impinges on a surface located between the one of the cylinder bores and an adjacent cylinder bore and is capable of deflecting the torch jet exiting from the coating torch when the torch jet is located above the upper surface of the cylinder block, wherein the blocking nozzles are controlled based on a position of the coating torch.

In embodiments, each said blocking nozzle comprises plural rows of openings.

The invention is also directed to a processing apparatus for coating a plurality of cylinder bores arranged in a row in a cylinder block having an upper surface, wherein the processing apparatus comprises a coating nozzle generating a torch jet and being structured and arranged to apply a coating to one of the cylinder bores, at least one blocking nozzle conveying a fluid and directing a fluid flow between the one of the cylinder bores and an adjacent cylinder bore. The at least one blocking nozzle being arranged to move independent of the coating torch and to a position over the upper surface of the cylinder block and being disposed outside a respective cylinder bore when the coating torch is located inside the respective cylinder bore, wherein the at least one blocking nozzle has an elongate body through which the fluid is conveyed in a linear direction before exiting as the fluid flow, and wherein, when the least one blocking nozzle is in the position over the upper surface of the cylinder block, said linear direction is parallel to a direction bisecting two adjacent cylinders and perpendicular to a direction defined by centers of the cylinder bores arranged in the row.

In embodiments, the blocking nozzle comprises plural rows of openings.

In embodiments, There is provided a method of coating a plurality of cylinder bores arranged in a row utilizing the apparatus, wherein the method comprises applying, with a coating torch, an internal coating on at least one of the cylinder bores and directing, with at least one blocking nozzle, a fluid flow between two adjacent cylinder bores in the row.

In embodiments, the blocking nozzle comprises plural rows of openings.

In embodiments, the at least one blocking nozzle is movable in coordination with the coating torch.

In embodiments, the fluid flow impinges on a horizontal surface located between the one of the cylinder bores and the adjacent cylinder bore and deflects the torch jet of the coating nozzle, and wherein the at least one blocking nozzle is controlled based on a position and alignment of the coating nozzle.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
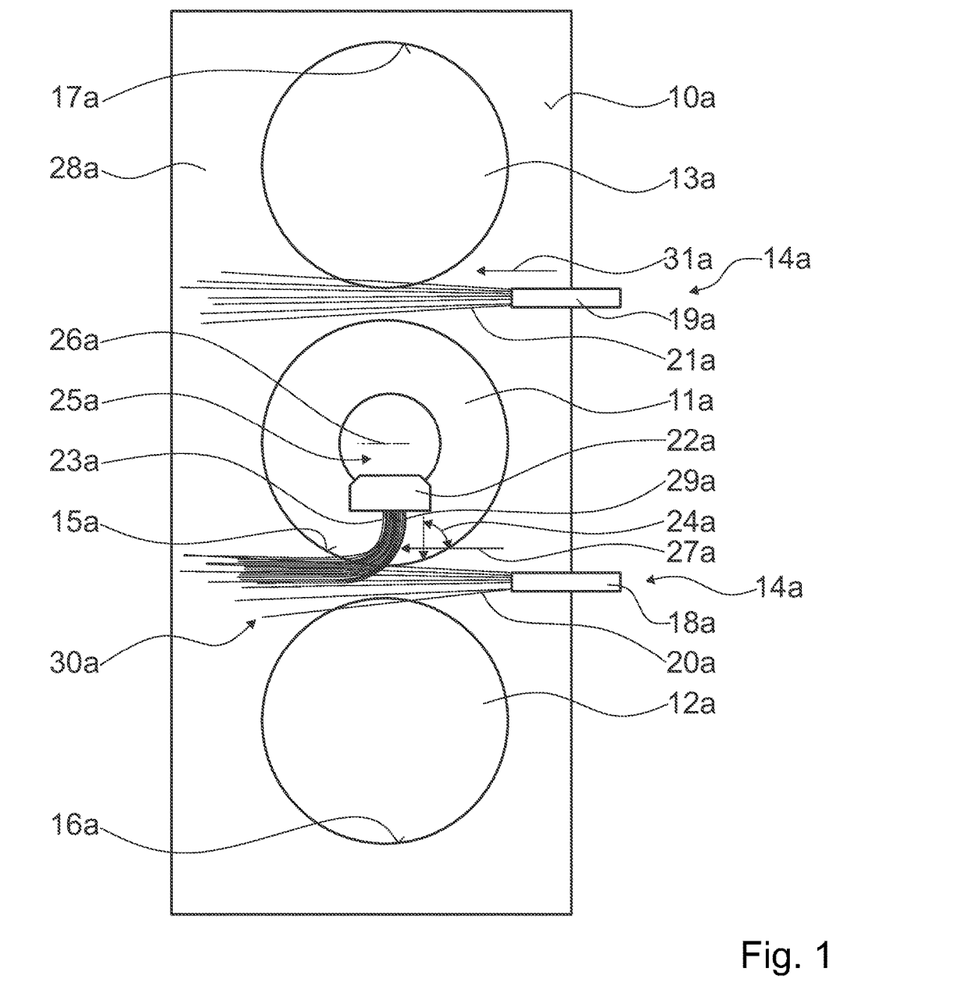
FIG. 1 shows a schematic representation of a processing device having a shield unit.
Figure 2:
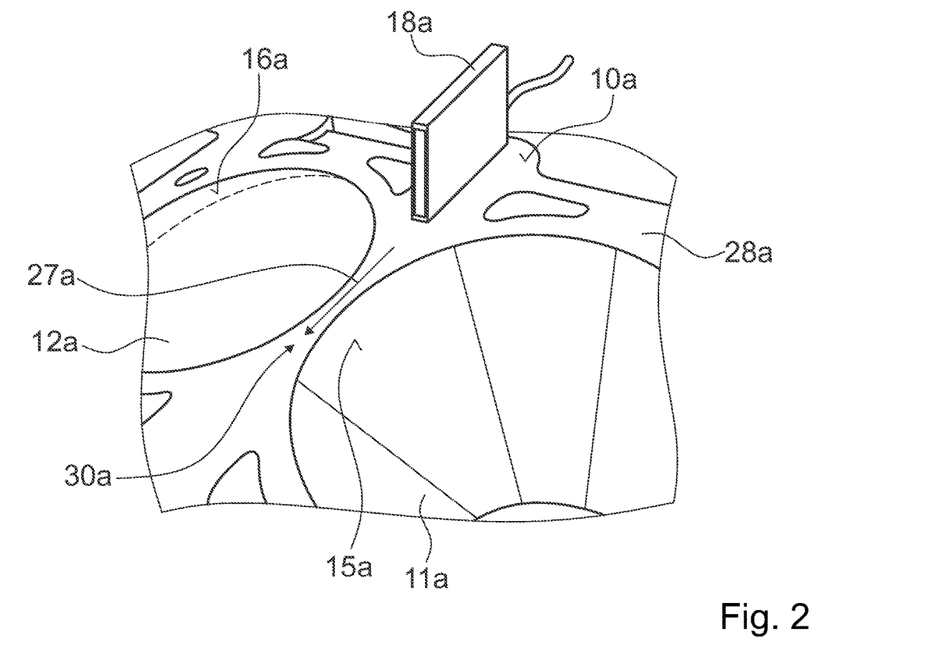
FIG. 2 shows a perspective representation of a workpiece configured as a crankshaft housing with a blocking nozzle.

FIGS. 1 and 2 show a processing apparatus for processing a workpiece 28a. The processing apparatus is preferably used for postprocessing cylinder bores 11a, 12a, 13a or combustion chambers in a cylinder housing, in particular in a crankshaft housing of internal combustion engines for motor vehicles. The processing apparatus is in particular provided for the internal coating of cylinder bores 11a, 12a, 13a or of combustion chambers. For example, inner walls of the cylinder bores 11a, 12a, 13a can be provided with a coating or a surface structure of the inner wall can be changed by the processing apparatus. The processing apparatus can, however, generally also be used for processing other hollow spaces.

The cylinder housings such as can be processed by the processing apparatus typically have a plurality of cylinder bores 11a, 12a, 13a which are arranged in a row. The processing apparatus is provided to process the cylinder bores 11a, 12a, 13a successively after one another, i.e. always only one of the cylinder bores 11a, 12a, 13a is processed. For processing the workpiece 28a, the processing apparatus comprises a torch 22a which is provided to be directed toward a workpiece surface 10a of the workpiece 28a, The torch 22a comprises a nozzle which is provided to generate a torch beam 23a which is directed toward the inner wall of the corresponding cylinder bore 11a, 12a, 13a in operation. The torch 22a has a radiation direction 29a which is aligned in operation perpendicular to a longitudinal direction of extent of the corresponding cylinder bore 11a, 12a, 13a, in operation, the torch 22a is introduced into the cylinder bore 11a, 12a, 13a to be processed along the longitudinal direction of extent and is directed toward the inner wall of the cylinder bore 11a, 12a, 13a. The inner wall of the corresponding cylinder bore 11a, 12a, 13a in such a case forms a part region 15a of the workpiece surface 10a of the workpiece 28a which is provided for a processing by the torch 22a.

Due to the design, the torch jet 23a generated by the torch 22a has an expanded region which in particular has the result on the processing of marginal regions of the cylinder bores 11a, 12a, 13a that the torch beam 23a can also be incident on part regions 16a, 17a of the workpiece surface 10a which are arranged adjacent to the part region 15a provided for the processing. To separate the part region 15a provided for processing and the adjacent part regions 16a, 17a from one another during operation, the processing apparatus has a shield unit 14a. The shield unit 14a is in this respect in particular provided to shield the part regions 16a, 17a, which are arranged adjacent to the part region 15a provided for processing, from the torch 22a.

To shield the part region 16a, the shield unit 14a has a blocking nozzle 18a which is provided to generate a fluid flow 20a for separating the part regions 15a, 16a. The blocking nozzle 18a is in this respect in particular provided to generate a fluid flow 20a which is directed along the workpiece surface 10a in a part region 30a which is arranged spatially between the two part regions 15a, 16a to be separated (cf. FIG. 2). The fluid flow 20a generated by the blocking nozzle 18a has an expanded portion by which the fluid flow 20a is at least partly also directed toward the workpiece surface 10a. The fluid opening 20a thus forms a barrier which adapts to the workpiece surface 10a. The part regions 15a, 16a of the workpiece surface 10a are separated from one another in a technical processing aspect by the fluid flow 20a.

The blocking nozzle 18a is configured as a compressed air nozzle. Compressed air is supplied to the blocking nozzle 18a, for example via a compressor, as a fluid for generating the fluid flow 20a. Alternatively, the blocking nozzle 18a can, however, also be operated using other operating media by which a fluid jet can be generated such as using nitrogen or using other gases. The blocking, nozzle 18a is preferably provided to generate a flat jet. The flat jet forms the technical flow barrier by which the part regions 15a, 16a of the workpiece surface 10a are separated from one another in operation. The blocking nozzle 18a can, however, generally also have a different design.

The fluid flow 20a which can he generated by the blocking nozzle 18a is provided to deflect the torch jet 23a of the torch 22a. The fluid flow 20a has a strength in operation which is at least substantially impenetrable for the torch jet 23a. The fluid flow 20a and the torch jet 23a are aligned at an angle 24a toward one another unequal to 180 degrees. The angle 24a at which the torch 22a and the blocking nozzle 18a are arranged toward one another ideally lies between 90 degrees and 135 degrees, but can generally also be smaller than 90 degrees or greater than 135 degrees. In the embodiment shown, the angle amounts to 90 degrees. The blocking nozzle 18a in this respect has a main expulsion direction 27a which includes the angle 24a of approximately 90 degrees with the radiation direction 29a of the torch 22a.

The blocking nozzle 18a can be positioned relative to the torch 22a. In operation, the blocking nozzle 18a is positioned such that the fluid flow 20a flows along the workpiece surface 10a. With a cylinder housing having a plurality of cylinder bores 11a, 12a, 13a arranged in a row, the blocking nozzle 18a is directed to the part region 30a between the two cylinder bores 11a, 12a. The fluid flow 20a thus separates the two cylinder bores 11a, 12a from one another in a technical processing aspect. The fluid flow 20a has the effect that the torch jet 23a of the torch 22a is only incident on the inner wall of the one cylinder bore 11a and is deflected before it is incident onto the inner wall of the other cylinder bore 12a.

In order also to separate the inner wall of the third cylinder bore 13a from the inner wall of the cylinder bore 11a which is provided for the processing, the shield unit 14a comprises a second blocking nozzle 19a. The further blocking nozzle 19a is configured in an analog manner to the first blocking nozzle 18a. The blocking nozzle 19a is likewise provided to generate a fluid flow 21a which is directed along the workpiece surface 10a of the workpiece 28a configured as a cylinder housing. The second blocking nozzle 19a is arrange opposite the first blocking nozzle 18a with respect to the torch 22a.

The two blocking nozzles 18a, 19a are aligned in parallel with one another. In operation, the fluid flow 20a generated by the first blocking nozzle 18a and the fluid flow 21a generated by the second blocking nozzle 19a flow substantially parallel to one another. A spacing between the two fluid flows 20a, 21a approximately corresponds to a diameter which the cylinder bore 11a has which is provided for the processing. The torch 22a is arranged in operation between the two fluid flows 20a, 21a, which are generated by the blocking nozzles 18a, 19a.

To guide the torch 22a, the processing apparatus comprises a support unit 25a which rotatably supports the torch 22a, The support unit 25a has a support axis 26a about which the torch 22a rotates at a defined rotational speed in operation. The total inner wall of the corresponding cylinder bore 11a is processed by the rotation of the torch 22a. The support axis 26a for the torch 22a is oriented perpendicular to the main expulsion directions 27a, 31a of the blocking nozzles 18a, 19a and in parallel with the longitudinal extent of the cylinder bore 11a.

The blocking nozzles 18a, 19a of the shield unit 14a each have a valve by which the blocking nozzles 18a, 19a can be individually controlled. The processing apparatus has a control unit, not shown in any more detail, to control the blocking nozzles 18a, 19a.

The control unit is provided to control the blocking nozzles 18a, 19a in dependence on a position and an alignment of the torch 22a. The control unit only activates the blocking nozzles 18a, 19a when the torch jet 23a can impact the adjacently arranged part regions 16a, 17a and deactivates the blocking nozzles 18a, 19 when the torch jet 23a is only incident onto the part region 15a of the workpiece surface 10a provided for the processing.

The axial position of the torch 22a along the longitudinal direction of extent of the cylinder bore 11a forms a primary control value for the blocking nozzle 18a, 19a. In particular when the torch 22a is immersed deep into the cylinder bore 11a, the torch jet 23a is completely incident onto the inner wall of the cylinder bore 11a so that only the part region 15a provided for the processing is exposed to the torch jet 23a. A value for axial positions at which the control unit deactivates the blocking nozzles 18a, 19a is stored in the control unit.

The angle-dependent alignment of the torch 22a with respect to the support axis 26b of the support unit 25a forms a further control value for the blocking nozzles 18a, 19a. The control unit which is simultaneously provided for controlling a drive for the torch 22a comprises a rotational speed sensor which is provided to determine a rotational speed of the torch 22a. The rotational speed sensor can, however, also generally be dispensed with when a motor having a fixed rotational speed such as a stepper motor is used for the drive. The control unit only activates the corresponding blocking nozzle 18a, 19a when the radiation direction 29a of the torch 22a and the main expulsion direction 27a, 31a of the corresponding blocking nozzle 18a, 19a intersect, i.e. when the torch jet 23a can be deflected by the fluid flow 20a, 21a of the corresponding blocking nozzle 18a, 19a. The fluid flow 20a, 21a of the corresponding blocking nozzle 18a, 19a thereby has a timing which the control unit adapts to the rotational speed of the torch 22a. The timing of the shut-of nozzles 18a, 19a can, however, generally also be dispensed with.

Figure 3:
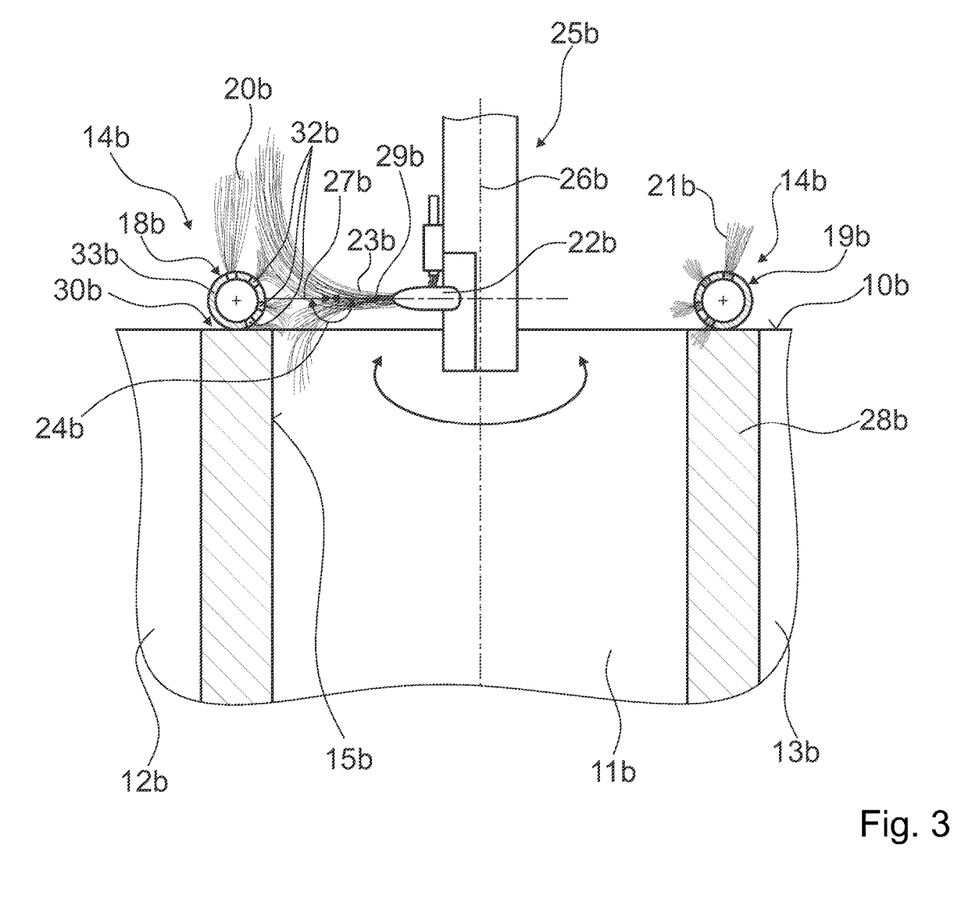
FIG. 3 shows a further embodiment of a processing apparatus with a shield unit in a side view.
Figure 4:
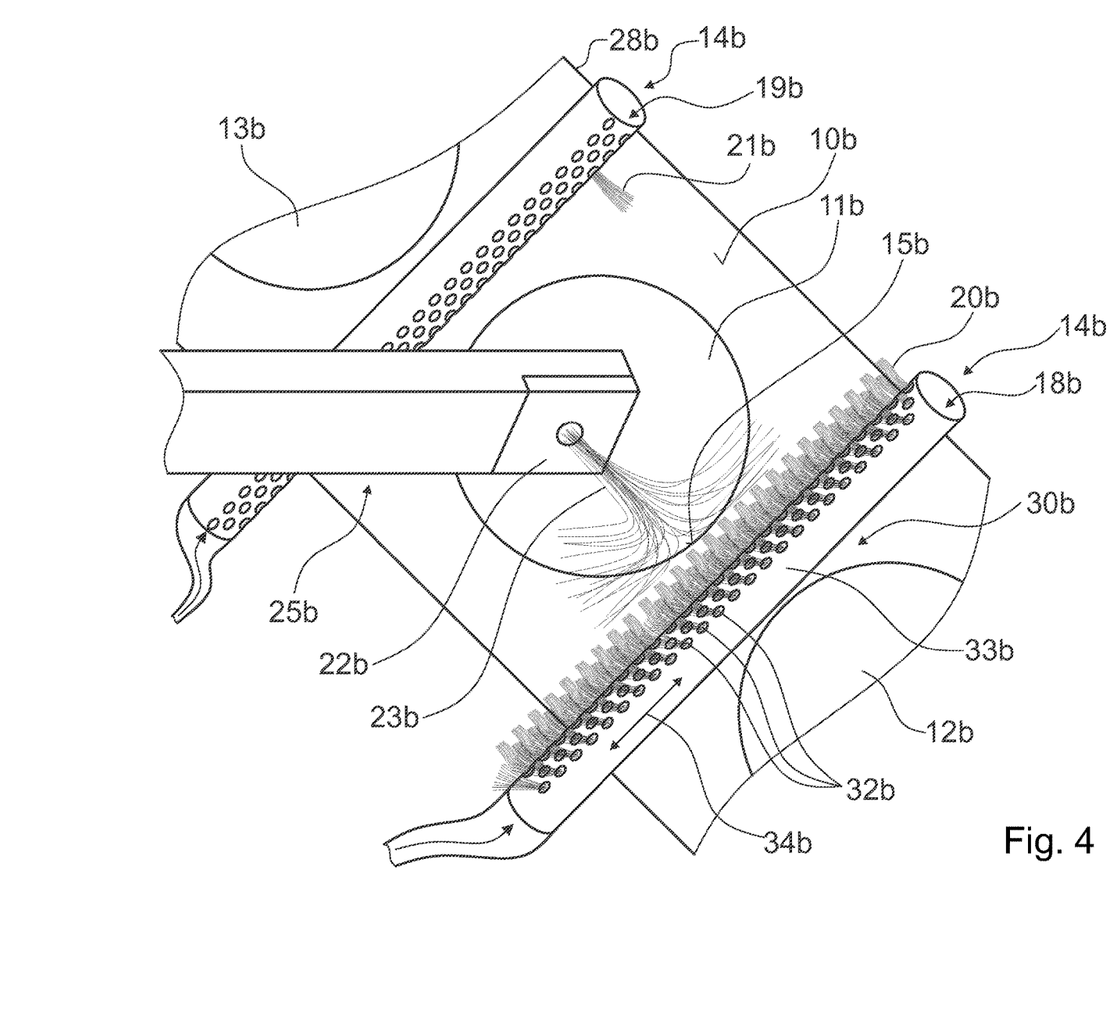
FIG. 4 shows the processing apparatus of FIG. 3 in a perspective representation.

A further embodiment of the invention is shown in FIGS. 3 and 4. The following descriptions are substantially restricted to the differences between the embodiments, with reference being able to be made to the description of the embodiment of FIGS. 1 and 2 with respect to components, features and functions which remain the same. To distinguish the embodiments, the letter a in the reference numerals of the embodiment in FIGS. 1 and 2 is replaced with the letter b in the reference numerals of the embodiment of FIGS. 3 and 4. Reference can generally also be made to the drawings and/or the description of the embodiment of FIGS. 1 and 2 with respect to components of the same name, in particular with respect to components with the same reference numerals.

FIGS. 3 and 4 show a further processing apparatus for processing a workpiece surface 10b, in particular for an internal coating of cylinder bores 11b, 12b, 13b in a crankshaft housing of an internal combustion engine having a plurality of cylinders arranged in a row. For processing the workpiece 28a, the processing apparatus comprises a torch 22b which is provided to be directed toward the workpiece surface 10b of the workpiece 28b. The torch 22b, which is configured analog to the preceding embodiment, comprises a nozzle which is provided to generate a torch jet 23b which is directed in operation toward an inner wall of the corresponding cylinder bore 11b, 12b, 13b. In addition, the processing apparatus comprises a support unit 25b for the torch 22b which is provided to rotate the torch 22b about a support axis 26 to process the total inner wall of the cylinder bore 11*b*. Analogously to the preceding embodiment, the inner wall of the cylinder bore 11*b* toward which the torch 22*b* is directed forms a part region 15*b* of the workpiece surface 10*b* provided for the processing, whereas the inner walls of the adjacently arranged cylinder bores 12*b*, 13*b* form part regions of the workpiece surface 10*b* which are not shown in any more detail and which are not provided for processing.

The processing apparatus comprises a shield unit 14*b* which is provided to separate from one another-during operation-the part region 15*b* of the workpiece surface 10*b* provided for the processing and adjacently arranged part regions of the workpiece surface 10*b*. The shield unit 14*b* has two blocking nozzles 18*b*, 19*b* which are provided to generate a fluid flow 20*b*, 21*b* for separating the part region 15*b* of the cylinder bore 11*b* which is provided for the processing and the part regions not shown in any more detail of the adjacently arranged cylinder bores 12*b*, 13*b* which are not provided for the simultaneous processing. The blocking nozzles 18*b*, 19*b* are provided to generate a fluid flow 20*b*, 21*b* which is aligned partly along the workpiece surface 10*b*. The blocking nozzles 18*b*, 19*b* are configured as compressed air nozzles.

Unlike the preceding embodiment, the blocking nozzles 18*b*, 19*b* are configured as multichannel nozzles which have a plurality of outflow openings 32*b*. The blocking nozzles 18*b*, 19*b* thereby generate a compressed air cushion which deflects the torch jet 23*b* of the torch 22*b*. The two blocking nozzles 18*b*, 19*a* are of identical design.

The blocking nozzle 18*b*, the same also applies correspondingly to the blocking nozzle 19*b*, comprises a base body 33*b* into which the outflow openings 32*b* are introduced. The base body 33 has a main direction of extent 34*b* which is directed perpendicular to the support axis 26*b* of the torch 22*b* and is directed perpendicular to an irradiation direction 29*b* of the torch 22*b*. The outflow openings 32*b* are introduced in the form of forms which are introduced into the base body 33*b*. The base body 33 has a round cross-section in the embodiment shown. It is of tubular design. A different design of the base body 33*b* is, however, generally also conceivable.

The outflow openings 32*b* introduced into the base body 33*b* are distributed along the main direction of extent 34*b* and along a peripheral direction over the base body 33*b*. The base body has a length along the main direction of extent 34*b* which is at least equally as large as a diameter which the cylinder bores 11*b*, 12*b*, 13*b* to be processed have. The outflow openings 32*b* are arranged in the form of a matrix arrangement which has a longitudinal extent along the main direction of extent 34*b* which is likewise at least equally as large as the diameter of the cylinder bores 11*b*, 12*b* to be processed. A plurality of rows of outflow openings 32*b* are arranged above one another perpendicular to the main direction of extent 34*b*. The matrix arrangement can in this respect have different transverse extents perpendicular to the main direction of extent 34*b*. The transverse extent in particular depends on the torch 22*b* used and/or on the cross-section of the base body 33*b*. If the base body 33*b*, as shown, has a round cross-section, the matrix arrangement can have a different transverse extent, as if the base body 33*b* had a rectangular cross-section.

The blocking nozzle 18*b* has a main expulsion direction 27*b* which is defined by the outflow openings 32*b* and which is aligned perpendicular to the support axis 26*b* of the torch 22*b*. The fluid flow 20*b* of the blocking nozzle 18*b* thereby has a mean flow direction which is directed parallel to the main expulsion direction 27*b*. The fluid flow 20*b* has an expansion of at least 90 degrees about the main expulsion direction 27*b* due to the transverse extent in the matrix arrangements of the outflow openings 32*b* of the base body 33*b*. In the embodiment shown, the expansion amounts to approximately 150 degrees.

The shield nozzle 18*b* is arranged between the cylinder bores 11*b*, 12*b* to shield the part regions of the workpiece surface 10*b* not provided for the processing. Due to the great expansion, some of the fluid flow 20*b* which can he generated by the blocking nozzle 18*b* is directed toward a part region 30*b* of the workpiece surface 10*b*. A further portion of the fluid flow 29*b* is directed along the workpiece surface 10*b* in the part region 30*b*. In addition, a portion of the fluid flow 20*b* is directed away from the workpiece surface 10*b*. The fluid flow 20*b* thereby forms the compressed air cushion which deflects the torch jet 23*b* of the torch 22*b* in operation. The blocking nozzle 18*b* and the torch 22*b* are in this respect arranged at an angle 24*b* of 180 degrees with respect to one another, i.e. the main expulsion direction 27*b* of the blocking nozzle 18*b* and an irradiation direction 29*b* of the torch 22*b* are arranged antiparallel to one another.

A design of the blocking nozzles 18*b*, 19*b* as multichannel nozzles having an expansion of less than 90 degrees is generally also conceivable. The base body 33*b* can, for example, have a rectangular cross-section having a surface which faces the torch 22*b* and in which all outflow openings 32*b* are introduced. The outflow openings 32*b* in such a design are each aligned parallel to one another and generate a compressed air cushion which deflects the torch jet 23*b* in front of the surface facing the torch 2*b*.

Figure 5:
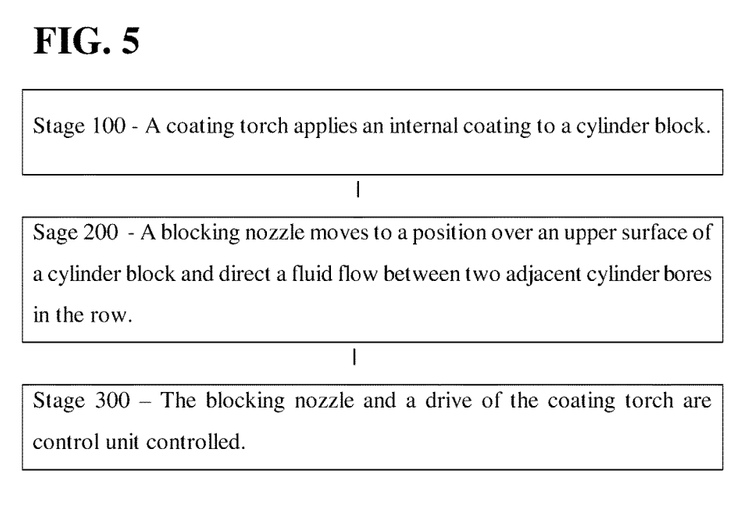
FIG. 5 shows a flow chart illustrating an operation of the processing device.

FIG. 5 shows a flow chart of an operation of the processing device discussed above. The flow chart describes a stage 100 where the processing apparatus has a coating torch structured and arranged to apply an internal coating. Another stage 200 describes a blocking nozzle arranged to move to a position over an upper surface of a cylinder block and direct a fluid flow between two adjacent cylinder bores in the row. A stage 300 describes the blocking nozzle and a drive of the coating torch being control unit controlled.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A processing apparatus for coating a plurality of cylinder bores arranged in a row in a cylinder block, the processing apparatus comprising: a coating torch structured and arranged to apply an internal coating on at least one of the cylinder bores; at least one blocking nozzle arranged to move to a position over a first portion of an upper surface of the cylinder block and configured to direct a fluid flow between two adjacent cylinder bores in the row; and said at least one blocking nozzle being: movable independently of the coating torch; disposed outside the at least one cylinder bore when the coating torch is located inside the at least one cylinder bore; and having a shape and size that can overlie the first portion of the upper surface between two adjacent cylinder bores while leaving exposed portions of the upper surface arranged on opposite sides of each of the two adjacent cylinder bores, wherein the at least one blocking nozzle and a drive of the coating torch are control unit controlled, and wherein the at least one blocking nozzle is movable into position over the plurality of cylinder bores and is controlled based on a position of the coating torch.

2. The processing apparatus in accordance with claim 1, wherein the at least one blocking nozzle is a compressed air nozzle.

3. The processing apparatus in accordance with claim 1, wherein the at least one blocking nozzle is configured to generate a flat jet.

4. The processing apparatus in accordance with claim 1, wherein the at least one blocking nozzle is configured to generate a compressed air cushion.

5. The processing apparatus in accordance with claim 1, wherein the blocking nozzle and the coating torch are arranged at angle toward one another between 80° and 150°.

6. The processing apparatus in accordance with claim 1, wherein the blocking nozzle and the coating torch are arranged at angle toward one another of 180°.

7. The processing apparatus in accordance with claim 1, further comprising a first blocking nozzle and a second blocking nozzle, said second blocking nozzle being arranged opposite the first blocking nozzle with respect to the coating torch.

8. The processing apparatus in accordance with claim 1, wherein a support unit for the coating torch has a support axis that is directed at least perpendicular to a main expulsion direction of the at least one blocking nozzle.

9. The processing apparatus in accordance with claim 1, wherein the at least one blocking nozzle is movable in coordination with the coating torch.

10. A processing apparatus for coating a plurality of cylinder bores arranged in a row in a cylinder block having an upper surface, the processing apparatus comprising: a coating torch producing a torch jet and being structured and arranged to apply a coating to at least one of the cylinder bores; blocking nozzles arranged parallel to one another and being movable independently of the coating torch, each of said blocking nozzles directing a fluid flow between a first cylinder bore and an adjacent cylinder bore; and
  each of said blocking nozzles being arranged to move to
    a position over the upper surface of the cylinder block
    and being: disposed outside a respective cylinder bore when the coating torch is located inside the respective cylinder bore; and having a shape and size that can overlie a first portion of the upper surface between the first cylinder bore and the adjacent cylinder bore while leaving exposed portions of the upper surface located on opposite sides of each of the first cylinder bore and the adjacent cylinder bore,
  wherein the fluid flow impinges on a portion of the upper surface of the cylinder block located between the first cylinder bore and the adjacent cylinder bore and is capable of deflecting the torch jet exiting from the coating torch when the torch jet is located above the upper surface of the cylinder block, wherein the blocking nozzles are controlled based on a position of the coating torch.

11. The processing apparatus in accordance with claim 10, wherein each of said blocking nozzles comprises plural rows of openings.

12. A method of coating a plurality of cylinder bores arranged in a row in a cylinder block utilizing a processing apparatus comprising: a coating torch structured and arranged to apply an internal coating on at least one of the cylinder bores; at least one blocking nozzle arranged to move to a position over a first portion of an upper surface of the cylinder block and configured to direct a fluid flow between two adjacent cylinder bores in the row; and said at least one blocking nozzle being; movable independently of the coating torch: disposed outside the at least one cylinder bore when the coating torch is located inside the at least one cylinder bore; and having a shape and size that can overlie the first portion of the upper surface between two adjacent cylinder bores while leaving exposed portions of the upper surface arranged on opposite sides of each of the two adjacent cylinder bores, wherein the at least one blocking nozzle and a drive of the coating torch are control unit controlled, and wherein the at least one blocking nozzle is movable into position over the plurality of cylinder bores and is controlled based on a position of the coating torch;
  the method comprising:
    applying with the coating torch the internal coating on at least one of the cylinder bores; and directing, with the at least one blocking nozzle, the fluid flow between the two adjacent cylinder bores in the row.

13. The method in accordance with claim 12, wherein the at least one blocking nozzle comprises plural rows of openings.

* * * * *